(12) United States Patent
Lailly et al.

(10) Patent No.: US 6,574,564 B2
(45) Date of Patent: *Jun. 3, 2003

(54) 3D PRESTACK SEISMIC DATA MIGRATION METHOD

(75) Inventors: Patrick Lailly, Pau (FR); Bertrand Duquet, Rueil-Malmaison (FR); Andreas Ehinger, Rueil-Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 94 days.

This patent is subject to a terminal disclaimer.

(21) Appl. No.: 09/828,151

(22) Filed: Apr. 9, 2001

(65) Prior Publication Data

US 2001/0051854 A1 Dec. 13, 2001

Related U.S. Application Data

(63) Continuation-in-part of application No. 09/408,515, filed on Sep. 30, 1999.

(51) Int. Cl.$^7$ .................................................. G01V 1/28
(52) U.S. Cl. .............................................. 702/14; 702/18
(58) Field of Search ............................... 702/14, 16, 17, 702/18; 367/73

(56) References Cited

U.S. PATENT DOCUMENTS

5,083,297 A   1/1992  Ostrander ............... 367/36
6,311,133 B1 * 10/2001 Lailly et al. .............. 702/18

FOREIGN PATENT DOCUMENTS

GB   2217014   2/1989

OTHER PUBLICATIONS

Biondo, Fomel and Chemingui, "Azimuth Moveout for 3–D Prestack Imaging", pp. 1–45, Jul. 30, 1997.

* cited by examiner

Primary Examiner—Edward Lefkowitz
Assistant Examiner—Anthony Gutierrez
(74) Attorney, Agent, or Firm—Antonelli, Terry, Stout & Kraus, LLP

(57) ABSTRACT

A prestack migration method allowing imaging of an underground zone, for a given velocity model of arbitrary complexity. The method allows obtaining elementary migrated images associated with the values assumed by a parameter and the sum of the images obtained for the different values of the parameter (post-migration stacking), in the depth domain as well as in the time domain. This migration is independent of the volume of the results calculated and of the number of seismic traces recorded. Volume images are obtained by taking account of all the seismic traces. Azimuth movout correction is applied to the received data to compensate for drift.

39 Claims, 6 Drawing Sheets

3D PRESTACK SEISMIC DATA MIGRATION METHOD

CROSS-REFERENCE TO RELATED APPLICATION

This application is a continuation-in-part of U.S. patent application Ser. No. 09/408,515 entitled 3D Prestack Seismic Data Migration Method filed Sep. 30, 1999 which application is incorporated herein by reference in its entirety.

BACKGROUND OF THE INVENTION

1. Field of the Invention

The present invention relates to a method of performing prestack migration of recorded seismic events for imaging a part of an underground zone.

The method according to the invention performs 3D prestack depth migration, for a given velocity model, for imaging the various geologic interfaces or heterogeneities of a part of the substrate.

2. Description of the Prior Art

Prestack migration is a conventional method of processing seismic data. The technique generally consists, knowing the value of a wavefield at known depth, on the surface for example, and a model of the distribution of the wave propagation velocities in the zone, in modelling the propagation of the source field and the retropropagation of the recorded reflection data and in seeking phase coherences between these two modelled fields.

There are three main prestack migation types:

shotpoint migration: the source field is the vibrating state generated by the shotpoint and the reflection data are the response of the subsurface to this source field;

plane wave migration, also called common illumination angle migration: the source field is the plane wave considered and the reflection data are the response of the subsurface to this source field;

offset migration: the source field is the one emitted by a shotpoint and the reflection data are the records obtained by the pickup(s) associated with this shotpoint having the offset considered; in such a migration, migration of the data associated with an offset requires as many wave propagation and retropropagation modellings as there are shotpoints and stacking of the results obtained for each shotpoint.

Examples of implementations of this type of techniques are for example described in:

Claerbout, J. F., 1985; Imaging the Earth's interior; Blackwell Publications,

Duquet, B., 1996; Amelioration de I'Imagerie Sismique de Structures Géologiques Complexes; thèse, Université Paris 13, or Whitmore, N. D., Felinsky, W. F., Murphy, G. E. and Gray, S. H., 1993; The Application of Common Offset and Common Angle Pre-stack Depth Migration in the North sea, 55$^{th}$ Mtg., EAGE, Expanded abstract.

The main drawback of conventional implementations based on the Kirchhoff equation (or more elaborate versions of this technique, itself based on high-frequency asymptotic techniques) is that they are generally very costly in calculation time because of the volume of the data to be processed and of the results, especially when the velocity field varies laterally (which complicates the arrival time calculations required for implementing this method). For economy reasons, one is often led to limit the volumes of data (by decimation) and/or the amount of results produced (imaged volume of reduced size, rough sampling of the results).

FIG. 6 illustrates an example of a situation which occurs in marine seismic prospection where azimuth moveout correction is necessary. The seismic response of a subterranean formation to seismic waves generated by a seismic source (Si) (an airgun for example) are sensed by receivers (R1 ... $R^j_i$ ... Rn) in a seismic streamer 10 towed by a towing boat 12. Because of a rough sea or currents, the streamer may drift with at least a part of the receivers being out of the route XX following the towing boat 12. As a result of this drift, the azimuth of the directions between the seismic source Si position and at least some of the receivers ($R^j_i$) position is not correct. Azimuth moveout correction have also been applied in many other situations in marine seismic prospection when for example several seismic streamers are towed by the towing boat, and also in seismic prospection on land.

In such a typical case, the well-known technique of azimuth moveout correction can be applied for correction of the data obtained from the drifted receivers $R^j_i$, which are out of line with the towing boat route XX is used to process the data to convert the data to a form that the data would have been recorded if the receivers were in line with the boat route XX. See "Azimuth Moveout for 3-D Prestack Imaging" (pages 1–45) Biondo, Fomel and Chemingui, Jul. 30, 1997 which publication is incorporated herein by reference in its entirety. Azimuth moveout correction has also been applied in many other situations in marine prospection when for example several seismic streamers are towed by the towing boat and also in seismic prospection on land.

SUMMARY OF THE INVENTION

The method according to the invention performs migration of seismic data for imaging a part of an underground zone, the seismic data being obtained after a series of $N_s$ seismic reflection cycles comprising each successive emission of elementary wavefields defined each by association of a seismic signal W(t) and of a point of emission in a series of points of emission Si with $1 \leq i \leq N_s$, reception, by seismic receivers placed in positions $R^j_i$, of the seismic signals reflected by the zone in response to each of these wavefields, and recording of the various signals received by each seismic receiver a time-dependent seismic traces $d^j_i(t)$.

The invention, for a given velocity model, comprises the following steps:

a) applying an azimuth moveout correction to data representing the recorded seismic signal sensed by different seismic receivers located at the points of reception for having all directions between points of emission and points of reception collinear to a common direction.

b) defining a slowness vector p whose two components $p_1$ and $p_2$ can each assume a sequence of previously defined values;

c) defining, for a given slowness vector p and a given point of emission $S_i$, a time lag function $t_0$ (p, i)

d) applying a time lag function $t_0$ (p, i) to each elementary wavefield (associated with point of emission $S_i$) and forming a first surface composite wavefield by spatiotemporal superposition of the various elementary wavefields to which such a time lag is applied;

e) applying a time lag $t_0$ (p, i) to each seismic trace $d^j_i(t)$ marked by the pair (i,j) and forming a surface composite trace field by spatiotemporal superposition of the various seismic traces to which such a time lag is applied;

f) performing migration of the composite trace field using the composite wavefield as the wavefield, by modelling the propagation of the composite wavefield and the retropropagation of the composite trace field and by suitably combining the two composite fields thus modelled at any point of the zone to be imaged;

g) repeating steps c) to e) for all the values assumed by the components $p_1$ and $p_2$ of the vector p; and h) for any set value of the second component $p_2$ of the vector p, stacking the result of these various combinations so as to obtain a migrated image associated with this set value of $p_2$, thus performing prestack migration.

According to an embodiment, the results obtained can be stacked at g) for all the values assumed by parameter $p_2$, thus performing post-migration stacking.

According to an embodiment, post-migration stacking can be achieved directly without step g).

The method can also comprise updating velocities by analysis of the deformations obtained when the second coordinate $p_2$ of vector p is varied.

According to an embodiment, a migrated image of a part of the zone to be imaged can be formed by using the wave conversion phenomenon, by definition of at least part of the velocity field in P waves and S waves (by applying previously for example preprocessing suited to the data so as to separate the various types of seismic events).

Steps a) to h) can be used for determining the gradient of a cost function involved in an inverse seismic problem.

It is also possible to replace a depth migration by a time migration.

The method of the invention has many advantages:

1) The invention performs migration at an attractive price (calculation cost) because of being independent of the volume of results calculated and of the number of seismic traces recorded, which is unlike conventional Kirchhoff type methods. Only the volume of the zone in which the waves are propagated has an effect on the calculation cost. Volume images are thus obtained by taking account of all the seismic traces at an advantageous cost. This method is considered to decrease by a factor of the order of several tens the calculation time required for 3D prestack migration.

2) The method is applied for velocity models or arbitrary complexity as long as the notion of prestack migration retains its meaning. It is applied without encountering any of the limitations specific to the high-frequency asymptotic techniques (geometric optics) commonly used for 3D prestack migrations.

The method can be implemented by means of conventional wave propagation and retropropagation modelling tools, described for example in the aforementioned book by Duquet B.

Application of the method obtains elementary migrated images associated with a given value of a parameter and the sum of these images (post-migration stack), in the depth domain as well as in the time domain.

In the above method it is assumed that the directions between the emission points $S_i$ and the reception points $R^j_i$ of the receivers are collinear to a common direction. To obtain the initial shot a preprocessing step is applied to the data corresponding to the recorded signals using the well known processing technique of azimuth moveout correction as discussed above. The invention in accordance with the foregoing azimuth moveout correction applies a correction to the data representing the recorded signals having directions between the emission points and the reception points not collinear to a common direction, as described above with reference to the prior art, to compensate for drift of a towed streamer causing the receivers to not be in line with the direction of travel of the towing boat.

BRIEF DESCRIPTION OF THE DRAWINGS

Other features and advantages of the method according to the invention will be clear from reading the description hereafter of a non limitative realization example, with reference to the accompanying drawings wherein.

DETAILED DESCRIPTION OF THE INVENTION

Definitions, Notations and Hypotheses Required

Figure 1:
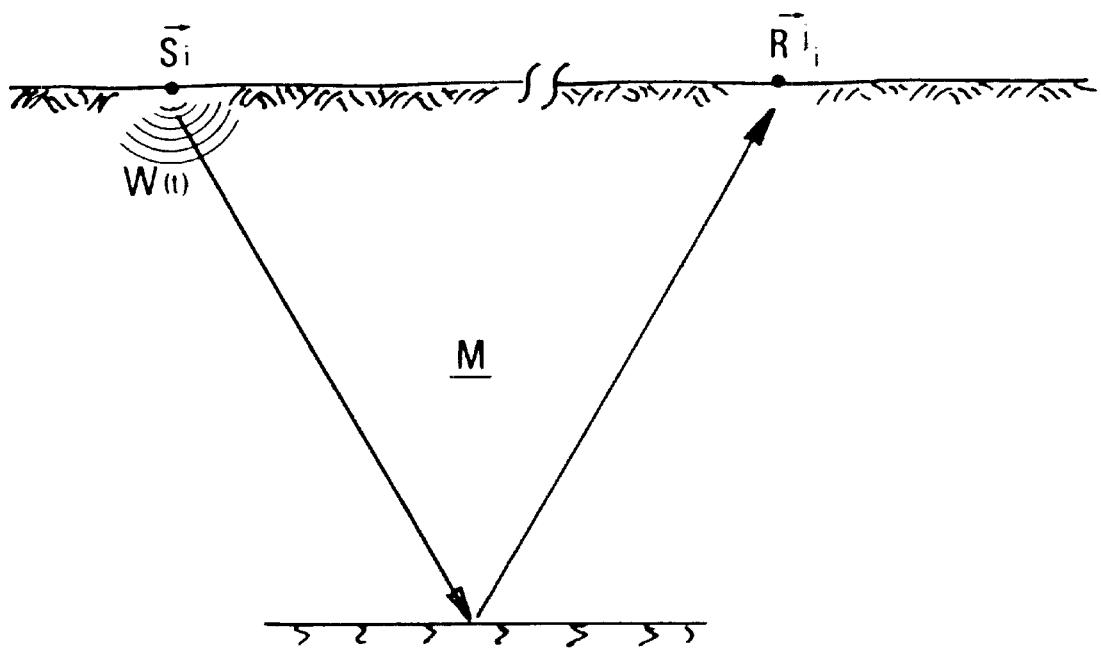
FIG. 1 shows, very schematically, a layout of points of emission $S_i$ and of points of seismic reception $R^j_i$ of an explored underground zone where horizons of the subsurface are to be restored.
Figure 2:
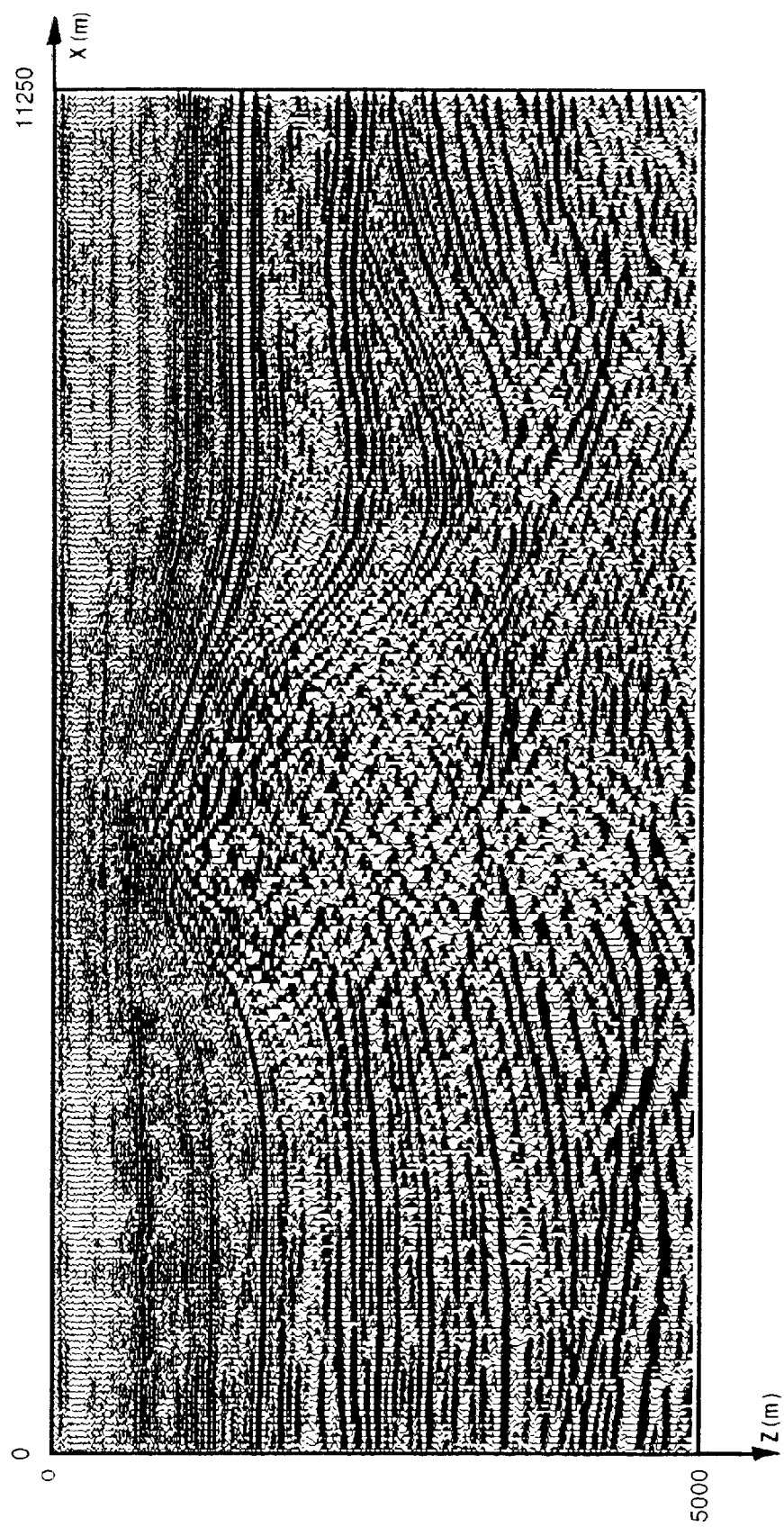
FIG. 2 shows, a record section extracted from a 3D post-stack depth migrated data block, obtained within the scope of seismic exploration of a salt structure in the North Sea.
Figure 3:
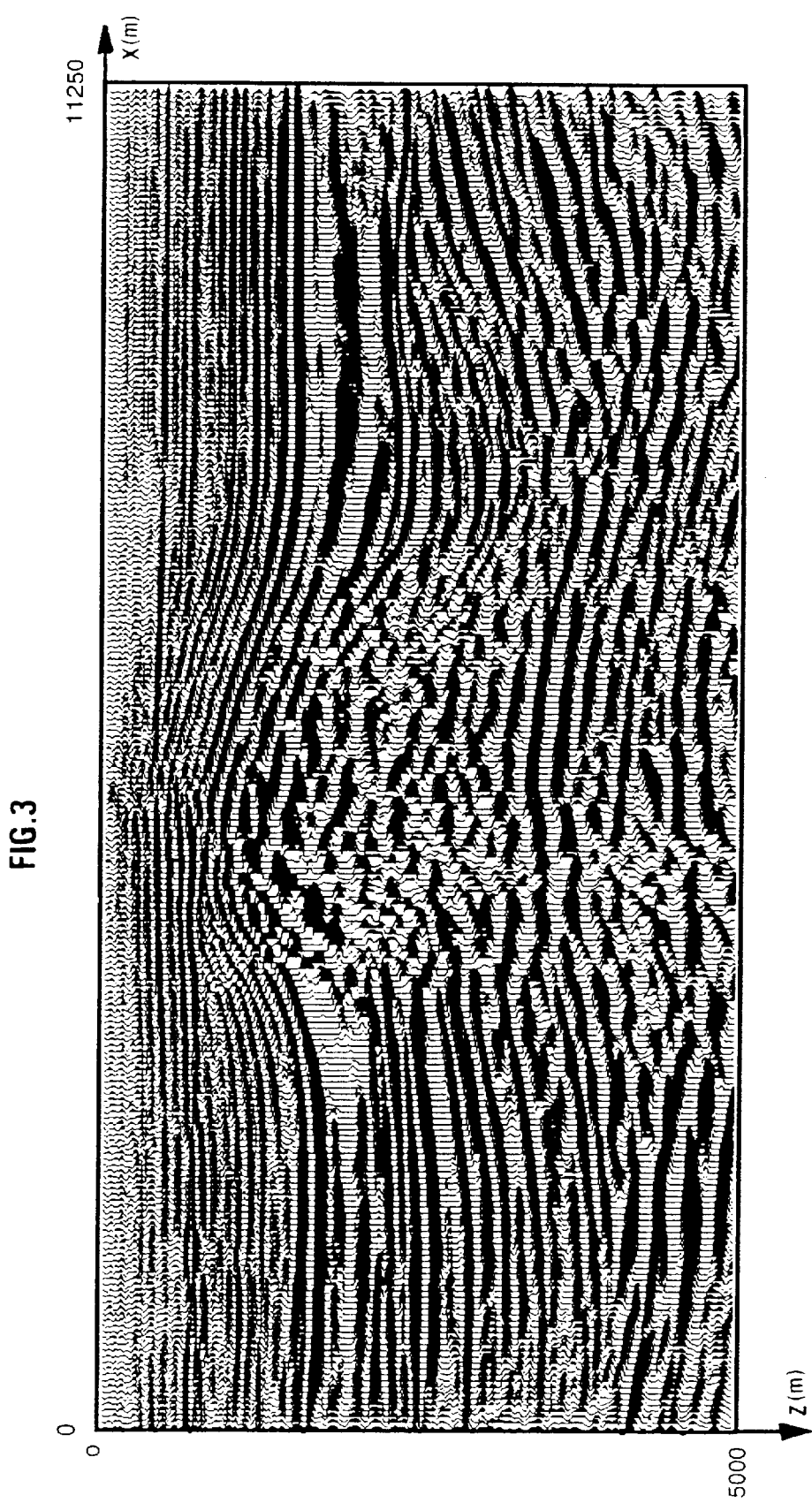
FIG. 3 shows, a record section coinciding with the record section of FIG. 2, extracted from a 3D prestack depth migrated data block by means of the method according to the invention, using the velocity model used for FIG. 2.
Figure 4:
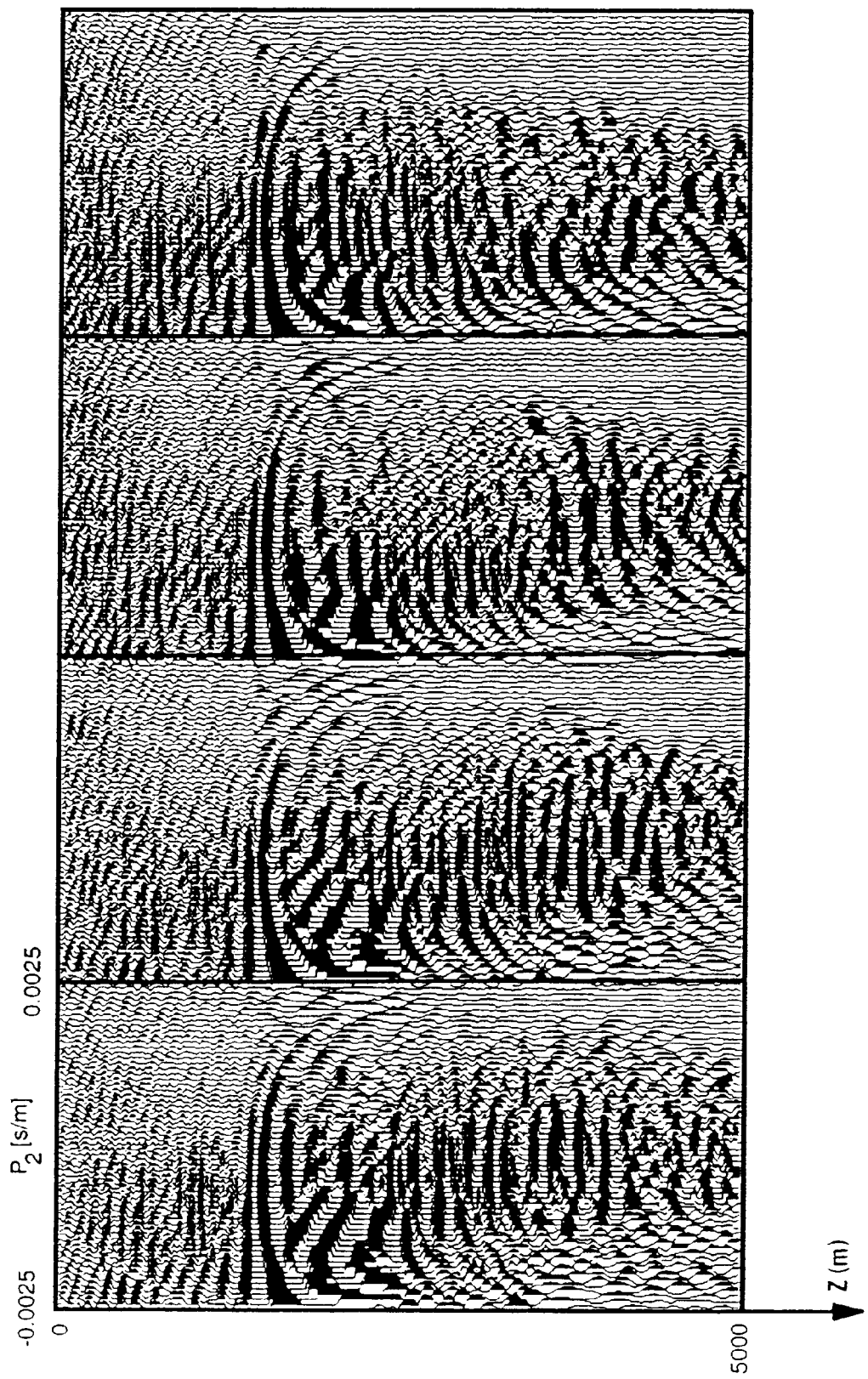
FIG. 4 shows, at four different points of the underground zone surface, the 3D prestack depth migrated images obtained with the method according to the invention when the second component $p_2$ of vector p varies in its definition domain, analysis of the deformation of the events observed in these images allowing the velocity model to be updated.

The method according to the invention performs migration of seismic data for imaging an underground zone M, the seismic data being obtained after a series of $N_s$ seismic cycles, each one (FIG. 1) comprising emission of a seismic signal W(t) from a point of emission $S_i$ with $1 \leq i \leq N_s$, reception by seismic receivers placed in positions $R^j_i$, of the seismic signals reflected by the zone discontinuities and recording of the various signals received by each seismic receiver as a seismic trace $d^j_i(t)$. It is assumed that each seismic source emits the same signal W(t), since such a situation can always be obtained by suitable preprocessing of the data such a deconvolution.

The term profile refers to a set of aligned points of emission and it is assumed that all the signal acquisitions are performed using parallel emission profiles. It is assumed that, for each source, the receivers are located on the profile where it is situated (marked by point of emission $S_i$). In fact, the method proves to be robust as regards the accuracy with which these hypotheses are verified. The previous hypotheses are mainly made in order to introduce the notations below.

An orthonormal reference system is defined, whose first axis is perpendicular to the direction of the profile and whose second axis is parallel to this direction, and a slowness vector p (homogeneous to the inverse of a velocity, as it is well-known) whose components $p_1$ and $p_2$ respectively measure the components along these two axes of this slowness vector p. A time lag function is defined for a given slowness vector p and a source located at a given point of emission $S_i$:

$$t_0(p,i) = p.(S_i - S_0) \qquad (1)$$

where $S_0$ represents any point of the acquisition domain.

Processing

Selection of Vector p

A finite set $P_1$ of values assumed by parameter $p_1$ and a finite set $P_2$ of values assumed by parameter $p_2$ are first selected. Set $E = P_1 \times P_2$ will be all the (vector values) assumed by vector p. The set $P_1$ of values assumed by parameters $p_1$ can for example be constructed by sampling the $[-p_1\min, p_1\max]$ range with a regular sampling interval $\delta p_1$. The value to be given to interval $\delta p_1$ notably depends on the desired accuracy and on the spacing between the profiles. A typical value is: $\delta p_1 = 2.5.10^{-5}$ s/m. The values to be given to $p_1$ min and $p_1$ max depend on the complexity of the structure in the direction orthogonal to the profile. Typical values are: $-p_1\min = p_1\max = 2.5.10^{-4}$ s/m. The set $P_2$ of values assumed by parameter $p_2$ can for example be constructed by sampling the $[-p_2\min, p_2\max]$ range with a regular sampling interval $\delta p_2$. The value to be given to $\delta p_2$ notably depends on the desired accuracy and on the fineness with which the evolution of the events in the image point collections is to be followed when $p_2$ varies. A typical value is: $\delta p_2 = 2.5.10^{-5}$ s/m. The values to be given to $p_2$ min and $p_2$ max depend on the complexity of the structure in the direction of the profiles. Typical values are: $-p_2\min = p_2\max = 2.5.10^{-4}$ s/m.

A) Processing Stages

1) Generation of a First Surface Composite Wavefield (Source Field)

The wavelet W(t) connected to each source $S_i$ defines an elementary wavefield $W(t).\delta(X_{2D} - S_i)$ where vector $X_{2D}$ shows the position of any point at the ground surface and $\delta$ is a Dirac mass defined on $R^2$ and centered at the origin. After delaying the associated elementary wavefield by the time $t_0$ (p,i), a first surface composite wavefield is generated by spatiotemporal superposition of the various elementary wavefields thus delayed. The following function is thus defined:

$$W_{\bar{p}}(\bar{x}_{2D}, t) = \sum \delta(\bar{x}_{2D} - \bar{S}_i) W(t - t_0(\bar{p}, i)) \qquad (2)$$

2 Generation of a Second Surface Composite Wavefield (Trace Field)

After delaying by the time t0(p,i) the seismic trace $d_i^j(t)$ associated with each pair (point of emission Si, point of reception $R^j_i$) marked by pair (i,j), a second surface composite wavefield is generated by spatiotemporal superposition of the various seismic traces thus delayed. The following function is defined with the same notations:

$$D_{\bar{p}}(\bar{x}_{2D}, t) = \sum_{i,j} \delta(\bar{x}_{2D} - \bar{R}^j_i) d_i^j(t - t_0(\bar{p}, i)) \qquad (3)$$

3) Composite Source Field Propagation Modelling

The propagation of the composite source field is modelled by seeking periodic solutions of period T to the waves equation, using as the velocity distribution the distribution defined by the velocity model considered. A first propagated wavefield (depending on space and time) $W_p(X_{3D}, t)$ is thus obtained for any time t (the solution is periodic in time) and for any point of the part of the subsurface to be imaged, a point whose position is marked by vector $X_{3D}$. Period T is selected as is usual from the conventional migration algorithms (i.e. of the order of the recording time).

4) Composite Trace Field Retropropagation Modelling

The retropropagation of the composite trace field is modelled by seeking periodic solutions of period T to the wave equation, using as the velocity distribution the distribution defined by the velocity model considered. A retropropagated wavefield (depending on space and time) $D_p(X_{3D}, t)$ is thus obtained for any time T and for any point of the part of the subsurface to be imaged, a point whose position is marked by vector $X_{3D}$.

5) Seeking Phase Coherence

A possible phase coherence is then sought (by crosscorrelation calculations for example) between the first propagated composite wavefield and the second retropropagated composite trace field, at any point of the underground zone (subsurface) to be imaged, a point whose position is marked by vector $X_{3D}$. The following quantity is therefore evaluated, still in the case of crosscorrelation calculation:

$$M_{\bar{p}}(\bar{x}_{3D}) = \int_O^T W_{\bar{p}}(\bar{x}_{3D}, t) D_{\bar{p}}(\bar{x}_{3D}, t) dt. \qquad (4)$$

For the component $p_2$ having a given value in $p_2$, the results calculated in (4) are stacked when parameter $p_1$ goes through $p_1$. This stacking allows defining, for any image point marked by vector $X_{3D}$, function $M_{p2}(X_{3D})$ with the following formula:

$$M_{p2}(\bar{x}_{3D}) = \sum_{p1 \in P1} M_{\bar{p}}(\bar{x}_{3D}) \qquad (5)$$

Quantity (5) is interpreted as the value at point $X_{3D}$ of the superposition on the various acquisition profiles of the migrated images associated with a cylindrical wave with the acquisition profile as the axis and a slope defined by the slowness $p_2$.

B) Post-migration Stacking

It is furthermore possible to perform post-migration stacking by stacking the contributions (5) obtained for the various values of parameter $p_2$ belonging to $P_2$, according to the formula as follows:

$$M(\bar{x}_{3D}) = \sum_{p2 \in P2} M_{p2}(\bar{x}_{3D}) \qquad (6)$$

Variants

1) A first variant of steps A-3 and A-4 described above consists in solving at step A-3 an initial value problem and at A-4 a final value problem instead of seeking periodic solutions (conventional imaging procedures known as time reversal migration).

2) Another variant consists in replacing steps A-2 of generation of the first composite wavefield by generation of a plane wave whose slowness in the direction of the profiles and in the orthogonal direction is $p_2$ and $p_1$ respectively. This leads to the formula as follows:

$$W_{\bar{p}}(\bar{x}_{3D}) = W(t - \bar{p}.(\bar{x}_{2D} - So)) \qquad (7)$$

This variant shows a certain similarity between the processings implemented in the method and those used in the conventional plane wave migration method. An essential difference that constitutes the original feature of the method is that it allows carrying out a plane wave migration procedure even if acquisition does not allow synthesis of the subsurface response to a plane wave excitation, a response which is essential to know in known plane wave migration algorithms.

Figure 5:
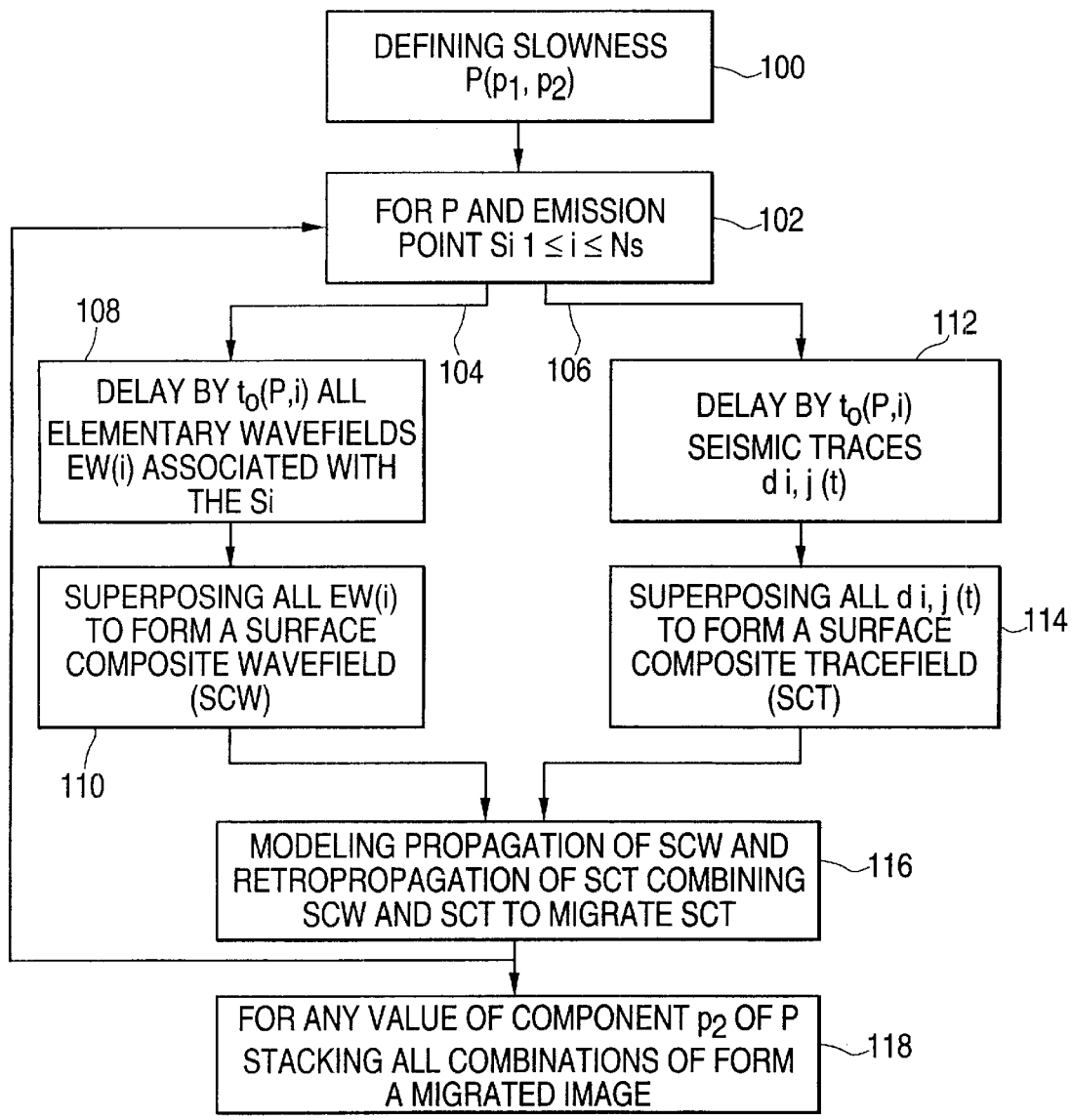
FIG. 5 illustrates a process in accordance with the invention.

FIG. 5 illustrates a method of performing prestack migration of seismic events for imaging a part of an underground zone from a series of a number $N_s$ of seismic reflection cycles, comprising successive emission of elementary wavefields. Each wavefield is defined by association of a seismic signal W(t) and of a point of emission defined in a series of points of emission $S_i$ with $1 \leq i \leq N_s$. Reception occurs with seismic receivers located in positions $R^j_i$ of seismic signals reflected by the zone in response to each of the elementary wavefields. Various signals are recorded which are received by each seismic receiver as time-dependent seismic traces $d^j_i(t)$ for a given velocity model.

The method comprises the following steps. The method is initiated at point 100 where slowness $P(p_1,p_2)$ is defined. The method proceeds to point 102 where for P and emission points Si where i is $\leq i \leq N_s$, processing is divided into two channels 104 and 106 respectively. The processing in channel 104 proceeds to point 108 where all elementary wavefields EW(i) associated with the emission point $S_i$ are delayed by $t_0(P, 1)$. The processing proceeds in channel 104 to point 110 where all elementary wavefields EW(i) are superposed to form a surface composite waveform (SCW). Processing in channel 106 proceeds to point 112 where seismic traces di,j(t) are delayed by $t_0(P, i)$. The processing proceeds to point 114 in channel 106 where all of $d_i^j(t)$ are superposed to form a surface composite trace field (SCT). At point 116 modeling of the propagation of SCW and the retropropagation of SCT occurs by combining SCW and SCT to migrate SCT. The aforementioned processing of channels 104 and 106 loops back to point 102 until each of the points $N_s$ have been processed. After processing of each point N is complete at point 116, the processing proceeds to point 118 where stacking of all combinations for any value of the component $P_2$ of P occurs to form a migrated image.

Figure 6:
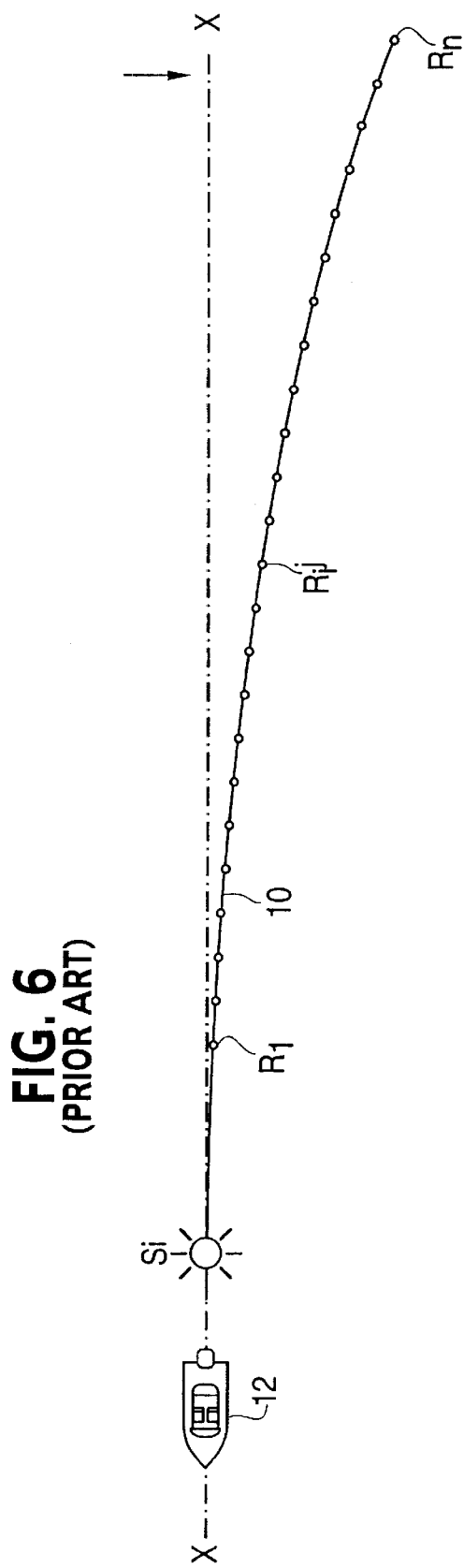
FIG. 6 illustrates the prior art application of azimuth moveout correction which may be used with the practice of the invention.

Azimuth moveout correction, in accordance with the prior art, is used to compensate the data received by towed receivers $R^j_i$ relative to seismic source Si as illustrated in FIG. 6 when the receivers drift out of line.

Other Applications

According to an embodiment, it is possible to form a migrated image of a part of the subsurface by using the wave conversion phenomenon, by definition of at least part of the velocity field in P waves and in S waves, possibly after suitably preprocessing the data in order to separate the various types of seismic events.

The steps defined above can also be used for calculating the gradient of a cost function involved in an inverse seismic problem.

While the invention has been described in terms of its preferred embodiment, it should be understood that numerous modifications must be made thereto without departing from the spirit and scope of the invention. It is intended that all such modifications fall within the scope of the applied claims.

What is claimed is:

1. A method of performing prestack migration of seismic events for imaging a part of an underground zone from a series of a number $N_s$ of seismic reflection cycles, comprising successive emission of elementary wavefields, each elementary wavefield defined by association of a seismic signal W(t) and points of emission defined in a series of points of emission Si with $1 \leq i \leq N_s$, seismic receivers located at points of reception $R^j_i$ of receiving seismic signals reflected by the underground zone in response to each of the wavefields, with signals received by each seismic receiver being recorded as time-dependent seismic traces $d^j_i(t)$, wherein for a given velocity model, the method comprises the following steps:

a) applying an azimuth moveout correction to data representing the recorded seismic signal sensed by the different receivers located at the points of reception for having all directions between the points of emission and the points of reception collinear to a common direction;

b) defining a slowness vector p having components $p_1$ and $p_2$ assuming a series of previously defined values;

c) defining, for a given slowness vector p and for a given point of emission $S_i$, a time lag function $t_0(p, i)$;

d) applying the time lag function $t_0(p, i)$ to each elementary wavefield associated with point of emission $S_i$ and forming a surface composite wavefield by spatiotemporal superposition of elementary wavefields to which such a time lag is applied;

e) applying the time lag function $t_0(p, i)$ to seismic traces $d^j_i(t)$ marked by a pair (i,j) and forming a surface composite trace field by spatiotemporal superposition of the seismic traces to which the time lag is applied;

f) performing migration of the surface composite trace field using the surface composite wavefield, by modelling propagation of the surface composite wavefield and retropropagation of the surface composite trace field, and combining the modelled propagation of the surface composite wavefield and the retropropagation of the surface composite trace field at any point of the zone to be imaged;

g) repeating steps c) to e) for all values assumed by the components $p_1$ and $p_2$ of the vector p; and h) for any set value of the second component $p_2$ of the vector p, stacking the results of combinations of the surface composite wavefield and the retropropagation of the surface composite tracer field to obtain a migrated image associated with the set value of $p_2$, to thereby perform prestack migration.

2. A method as claimed in claim 1, further comprising:

forming a final image representative of post-migration stacking of the surface composite trace fields obtained for all values $p_2$ of vector p.

3. A method as claimed in claim 2, wherein:

a migrated image of a part of the zone to be imaged is formed by using a wave conversion phenomenon, by definition of at least a part of a velocity field in P waves and S waves.

4. A method in accordance with claim 2, wherein:

the migration of a surface composite trace field is a time migration.

5. A method in accordance with claim 2, wherein:

the migration of a surface composite trace field is a depth migration.

6. A method as claimed in claim 3, comprising:

using preprocessing to separate seismic events.

7. A method in accordance with claim 3, wherein:

the migration of a surface composite trace field is a time migration.

8. A method in accordance with claim 3, wherein:

the migration of a surface composite trace field is a depth migration.

9. A method in accordance with claim 6, wherein:

the migration of a surface composite trace field is a time migration.

10. A method in accordance with claim 6, wherein:

the migration of a surface composite trace field is a depth migration.

11. A method as claimed in claim 1 wherein: steps a) to g) are used to directly perform post-migration stacking.

12. A method as claimed in claim 11, wherein:

a migrated image of a part of the zone to be imaged is formed by using a wave conversion phenomenon, by definition of at least a part of a velocity field in P waves and S waves.

13. A method in accordance with claim 11, wherein:

the migration of a surface composite trace field is a time migration.

14. A method in accordance with claim 11, wherein:

the migration of a surface composite trace field is a depth migration.

15. A method as claimed in claim 12, comprising:

using preprocessing to separate seismic events.

16. A method in accordance with claim 12, wherein:

the migration of a surface composite trace field is a time migration.

17. A method in accordance with claim 12, wherein:

the migration of a surface composite trace field is a depth migration.

18. A method in accordance with claim 15, wherein:

the migration of a surface composite trace field is a time migration.

19. A method in accordance with claim 15, wherein:

the migration of a surface composite trace field is a depth migration.

20. A method as claimed in claim 1, further comprising:

updating of velocities of the seismic signals W(t) by analysis of deformations obtained when a value $p_2$ of vector p is varied.

21. A method as claimed in claim 20, wherein:

a migrated image of a part of the zone to be imaged is formed by using a wave conversion phenomenon, by definition of at least a part of a velocity field in P waves and S waves.

22. A method in accordance with claim 20, wherein:

the migration of a surface composite trace field is a time migration.

23. A method in accordance with claim 20, wherein:

the migration of a surface composite trace field is a depth migration.

24. A method as claimed in claim 21, comprising:

using preprocessing to separate seismic events.

25. A method in accordance with claim 21, wherein:

the migration of a surface composite trace field is a time migration.

26. A method in accordance with claim 21, wherein:

the migration of a surface composite trace field is a depth migration.

27. A method in accordance with claim 24, wherein:

the migration of a surface composite trace field is a time migration.

28. A method in accordance with claim 24, wherein:

the migration of a surface composite trace field is a depth migration.

29. A method as claimed in claim 1, wherein:

a migrated image of a part of the zone to be imaged is formed by using a wave conversion phenomenon, by definition of at least a part of a velocity field in P waves and S waves.

30. A method as claimed in claim 29, comprising:

using preprocessing to separate seismic events.

31. A method in accordance with claim 29, wherein:

the migration of a surface composite trace field is a time migration.

32. A method in accordance with claim 29, wherein:

the migration of a surface composite trace field is a depth migration.

33. A method in accordance with claim 30, wherein:

the migration of a surface composite trace field is a time migration.

34. A method in accordance with claim 30, wherein:

the migration of a surface composite trace field is a depth migration.

35. A method as claimed in claim 1, wherein:

steps a) to g) are used to determine a gradient of a cost function involved in an inverse seismic problem.

36. A method in accordance with claim 35, wherein:

the migration of a surface composite trace field is a time migration.

37. A method in accordance with claim 35, wherein:

the migration of a surface composite trace field is a depth migration.

38. A method in accordance with claim 1, wherein:

the migration of a surface composite trace field is a time migration.

39. A method in accordance with claim 1, wherein:

the migration of a surface composite trace field is a depth migration.

* * * * *